United States Patent
Choi et al.

(10) Patent No.: US 9,141,250 B2
(45) Date of Patent: Sep. 22, 2015

(54) MOBILE TERMINAL AND METHOD FOR PROVIDING USER INTERFACE USING THE SAME

(75) Inventors: Woosik Choi, Seoul (KR); Jeonghwa Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 572 days.

(21) Appl. No.: 13/227,362

(22) Filed: Sep. 7, 2011

(65) Prior Publication Data

US 2012/0260198 A1    Oct. 11, 2012

(30) Foreign Application Priority Data

Apr. 6, 2011    (KR) .................... 10-2011-0031618

(51) Int. Cl.
- *G06F 3/048*    (2013.01)
- *H04N 5/44*    (2011.01)
- *H04N 21/462*    (2011.01)
- *H04N 21/478*    (2011.01)

(52) U.S. Cl.
CPC .............. *G06F 3/048* (2013.01); *H04N 5/4403* (2013.01); *H04N 21/4622* (2013.01); *H04N 21/478* (2013.01)

(58) Field of Classification Search
CPC .......... H04N 5/44543; H04N 21/4622; H04N 21/47; G11B 27/34; G11B 27/034; G06F 2203/04806; G06F 2203/04808; G06F 3/04886; G06F 3/048
USPC ......................................................... 715/716
See application file for complete search history.

(56) References Cited

U.S. PATENT DOCUMENTS

| | | | | |
|---|---|---|---|---|
| 7,124,374 | B1 * | 10/2006 | Haken ........................... | 715/859 |
| 7,373,605 | B2 * | 5/2008 | Schaper ........................ | 715/730 |
| 7,430,721 | B2 * | 9/2008 | Johanson et al. ............. | 715/761 |
| 7,870,496 | B1 * | 1/2011 | Sherwani ...................... | 715/761 |
| 8,046,701 | B2 * | 10/2011 | Chiu et al. .................... | 715/761 |
| 8,276,085 | B2 * | 9/2012 | Sherwani ...................... | 715/761 |
| 8,554,897 | B2 * | 10/2013 | Kim et al. ..................... | 709/223 |
| 2004/0031058 | A1 * | 2/2004 | Reisman ....................... | 725/112 |
| 2005/0097478 | A1 * | 5/2005 | Killian et al. ................. | 715/851 |
| 2008/0178097 | A1 * | 7/2008 | Lejeune ........................ | 715/761 |
| 2008/0221715 | A1 * | 9/2008 | Krzyzanowski et al. ....... | 700/90 |
| 2009/0319672 | A1 * | 12/2009 | Reisman ....................... | 709/227 |
| 2010/0031295 | A1 * | 2/2010 | Krzyzanowski et al. ....... | 725/52 |
| 2010/0277337 | A1 * | 11/2010 | Brodersen et al. ........ | 340/825.22 |
| 2010/0299436 | A1 * | 11/2010 | Khalid et al. ................. | 709/226 |
| 2011/0072345 | A1 * | 3/2011 | Lim ............................... | 715/702 |
| 2011/0119621 | A1 * | 5/2011 | Cho et al. ..................... | 715/788 |
| 2011/0163969 | A1 * | 7/2011 | Anzures et al. .............. | 345/173 |
| 2011/0205435 | A1 * | 8/2011 | Lee et al. ..................... | 348/563 |
| 2011/0209058 | A1 * | 8/2011 | Hinckley et al. ............. | 715/702 |
| 2011/0275391 | A1 * | 11/2011 | Lee et al. ..................... | 455/500 |
| 2012/0079429 | A1 * | 3/2012 | Stathacopoulos et al. .... | 715/830 |

(Continued)

*Primary Examiner* — Amy M Levy

(74) *Attorney, Agent, or Firm* — Birch, Stewart, Kolasch & Birch, LLP

(57) ABSTRACT

A mobile terminal including a display; an interface unit configured to transmit and receive data to and from an external display apparatus displaying information including an input region and a non-input region; and a controller configured to control the interface unit to receive data from the external display apparatus corresponding to the information displayed on the external display apparatus, to control the display to display a first screen including the input-region displayed on the external display apparatus and a second display screen including at least a portion of the non-input-region displayed on the external display apparatus.

16 Claims, 11 Drawing Sheets

(a)

(b)

(56) References Cited

U.S. PATENT DOCUMENTS

2012/0174157 A1* 7/2012 Stinson, III et al. ............ 725/40
2012/0274662 A1* 11/2012 Kim et al. .................... 345/650
2013/0033648 A1* 2/2013 Oh et al. ...................... 348/731
2013/0111369 A1* 5/2013 Pasquero et al. ............. 715/761

* cited by examiner (a)

(b)

(b)　　　　　　　　(a)　　　　　　　　(c)

(a)

(b)

MOBILE TERMINAL AND METHOD FOR PROVIDING USER INTERFACE USING THE SAME

This application claims the benefit of Korean Patent Application No. 10-2011-0031618, filed in Korea on Apr. 6, 2011, which is hereby incorporated by reference as if fully set forth herein.

BACKGROUND OF THE INVENTION

1. Field of the Invention

The present invention relates to a mobile terminal and a method for providing a User Interface (UI) using the mobile terminal, and more particularly, to a mobile terminal for displaying a screen of an external display apparatus and inputting data to the external display apparatus and a method for providing a UI using the mobile terminal.

2. Discussion of the Related Art

A display apparatus such as a TV, a PC, etc. provides a UI to a user through a remote control, a keyboard, a mouse, a keypad, etc. Therefore, to enter data such as text to the display apparatus, the user should inconveniently manipulate an input device like a remote control, a keyboard, a mouse, or a keypad.

SUMMARY OF THE INVENTION

Accordingly, the present invention is directed to a mobile terminal and a method for providing a user interface using the mobile terminal that substantially obviate one or more problems due to limitations and disadvantages of the related art.

An object of the present invention is to provide a mobile terminal for enabling a user to efficiently and readily input data such as text to a display apparatus and a method for providing a User Interface (UI) using the mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a display for displaying a screen to a user, an interface for transmitting and receiving data to and from an external display apparatus and receiving data from the user, and a controller for controlling the interface to receive screen information about the display apparatus, processing the screen information to divide a screen of the display into a first screen and a second screen, the first screen being an input screen of the display apparatus and the second screen being a part of the screen of the display apparatus, outputting the processed screen information, and controlling the interface to transmit data input to the input screen by the user to the display apparatus.

The controller may control the second screen according to a control signal input through the interface by the user.

The mobile terminal may further include a sensor unit for sensing a position and posture of the mobile terminal.

The controller may control the second screen according to information about the position and posture of the mobile terminal received from the sensor unit. The controller may move, rotate, zoom in, or zoom out the second screen. The controller may output a third screen corresponding to a keyboard screen to the display.

The controller may control the interface to receive identification information about an application being executed in the display apparatus, determine whether the application is present in the mobile terminal based on the identification information about the application, and in the presence of the application in the mobile terminal, execute the application.

The controller may control the interface to receive environment information about the application and execute the application according to the environment information about the application.

In the absence of the application in the mobile terminal, the controller may control the interface to receive screen information about the display apparatus and output the screen information to the display.

The first screen may be a messenger screen. The controller may configure the first and second screens as Picture-In-Picture (PIP) screens and output the PIP screens to the display.

In another aspect of the present invention, a method for providing a user interface using a mobile terminal includes receiving screen information about an external display apparatus from the display apparatus, processing the screen information to divide a screen of the display into a first screen and a second screen, the first screen being an input screen of the display apparatus and the second screen being a part of the screen of the display apparatus, and outputting the processed screen information to a display of the mobile terminal, and transmitting data input to the input screen by a user to the display apparatus.

The method may further include controlling the second screen according to a control signal input to the mobile terminal by the user.

The method may further include sensing a position and posture of the mobile terminal, controlling the second screen according to information about the position and posture of the mobile terminal, moving, rotating, zooming in, or zooming out the second screen, and/or outputting a third screen corresponding to a keyboard screen to the display.

The method may further include receiving identification information about an application being executed in the display apparatus, determining whether the application is present in the mobile terminal based on the identification information about the application, executing the application, in the presence of the application in the mobile terminal.

The method may further include receiving environment information about the application, and executing the application according to the environment information about the application.

The method may further include receiving screen information about the display apparatus, in the absence of the application in the mobile terminal, and outputting the screen information to the display.

The first screen may be a messenger screen.

The method may further include configuring the first and second screens as PIP screens and outputting the PIP screens to the display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The terms used in the present invention are general terms broadly used at present. However, some terms are selected by the applicant, which are explained in detail in the description of the present invention. Accordingly, the present invention should be understood by the meanings of the terms, not by the names of the terms.

The terms "module" and "unit" attached to the ends of the names of components are used interchangeably, for the convenience' sake of description. They are not differentiated in meaning or function.

In the present invention, a mobile terminal may be any of terminals that a user can use while moving, such as a smart phone, a Personal Digital Assistant (PDA), a Portable Multimedia Player (PMP), etc.

The term "display apparatus" covers a broad range of devices that can output screens, like a TV, a laptop computer, a digital broadcast terminal, a navigator, etc.

Figure 1:
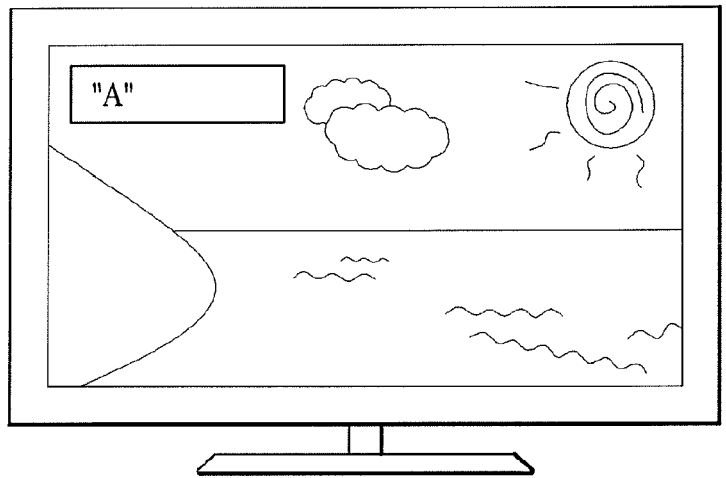
FIGS. 1 and 2 illustrate environments in which a User Interface (UI) is provided using a mobile terminal according to an embodiment of the present invention.
Figure 1:
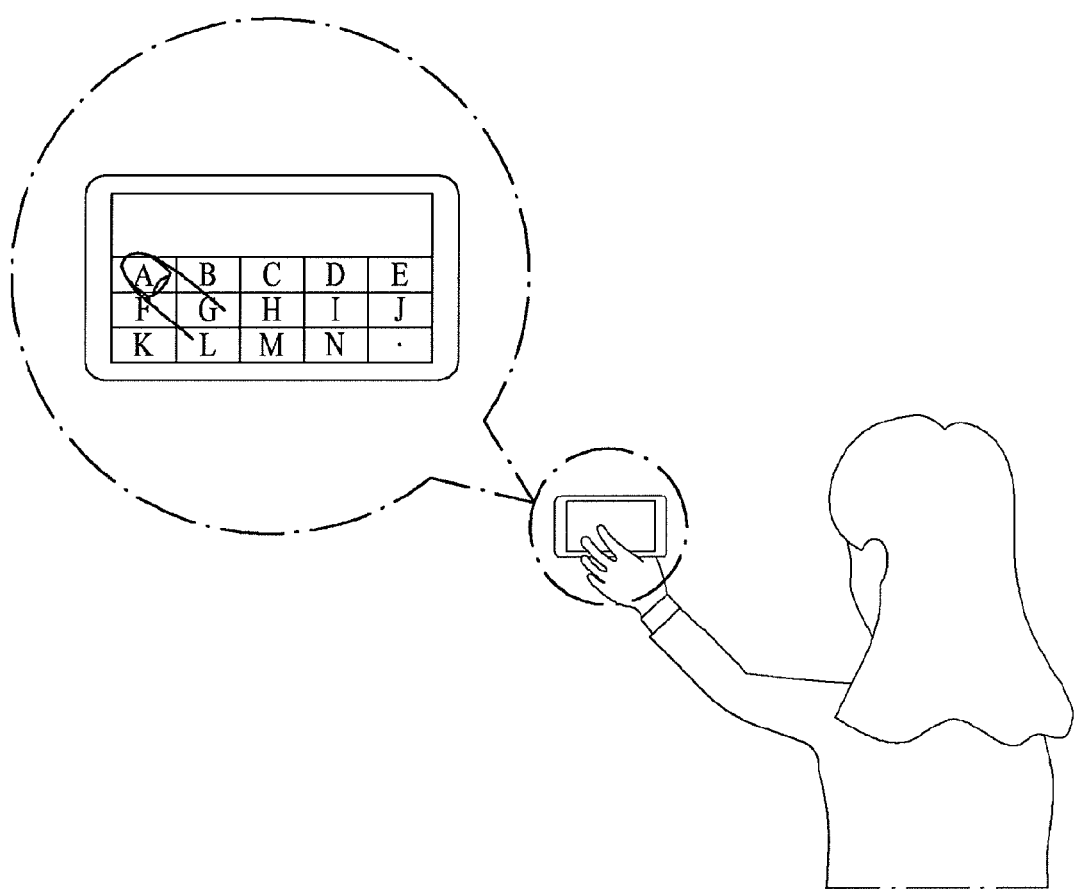
Figure 2:
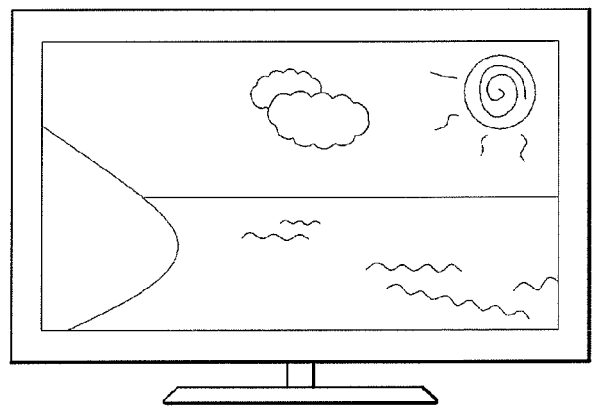
Figure 2:
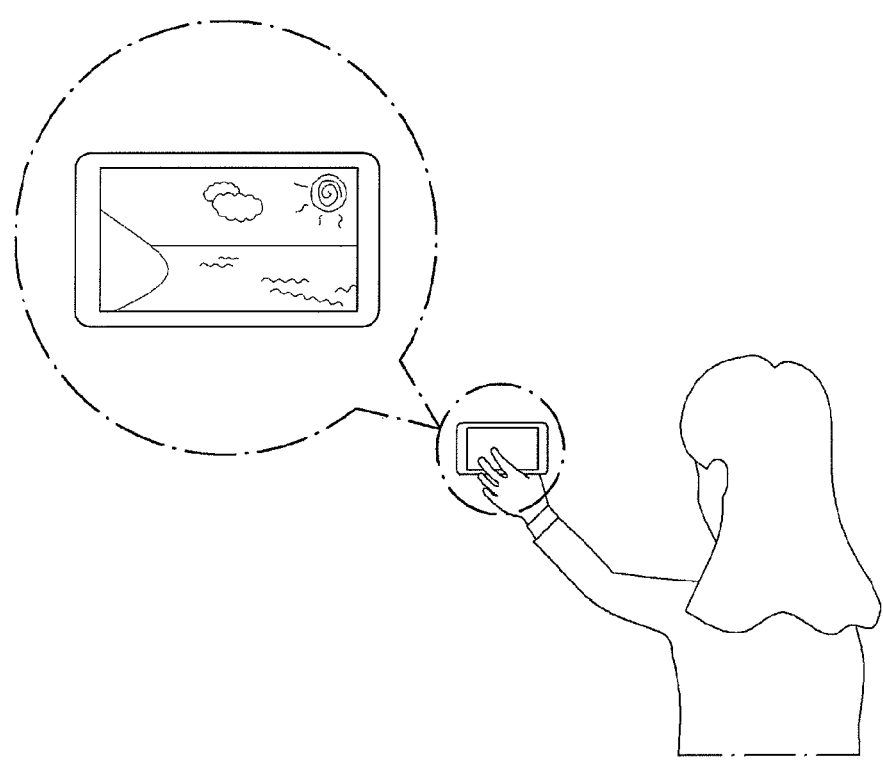

FIGS. 1 and 2 illustrate environments in which a User Interface (UI) is provided using a mobile terminal according to an embodiment of the present invention.

The present invention provides a UI using a mobile terminal so that a screen of an external display apparatus can be output to the mobile terminal or data such as text can be input to the display apparatus through the mobile terminal.

FIG. 1 illustrates a UI providing environment in which text is input to a display apparatus through a mobile terminal. The mobile terminal may transmit user-input data such as text to the display apparatus and the display apparatus may display the received user-input data.

FIG. 2 illustrates a UI providing environment in which a screen of the display apparatus is output to the mobile terminal. The mobile terminal may be configured so as to receive screen information about the display apparatus and output it.

The user requests the afore-described UI by inputting a predetermined command to the mobile terminal or the display apparatus. The mobile terminal and the display apparatus provide the user-requested UI through data transmission between them according to an embodiment of the present invention.

Before describing a method for providing a UI using a mobile terminal according to an embodiment of the present invention, the configurations of a display apparatus and a mobile terminal for providing a UI will first be described below.

Figure 3:
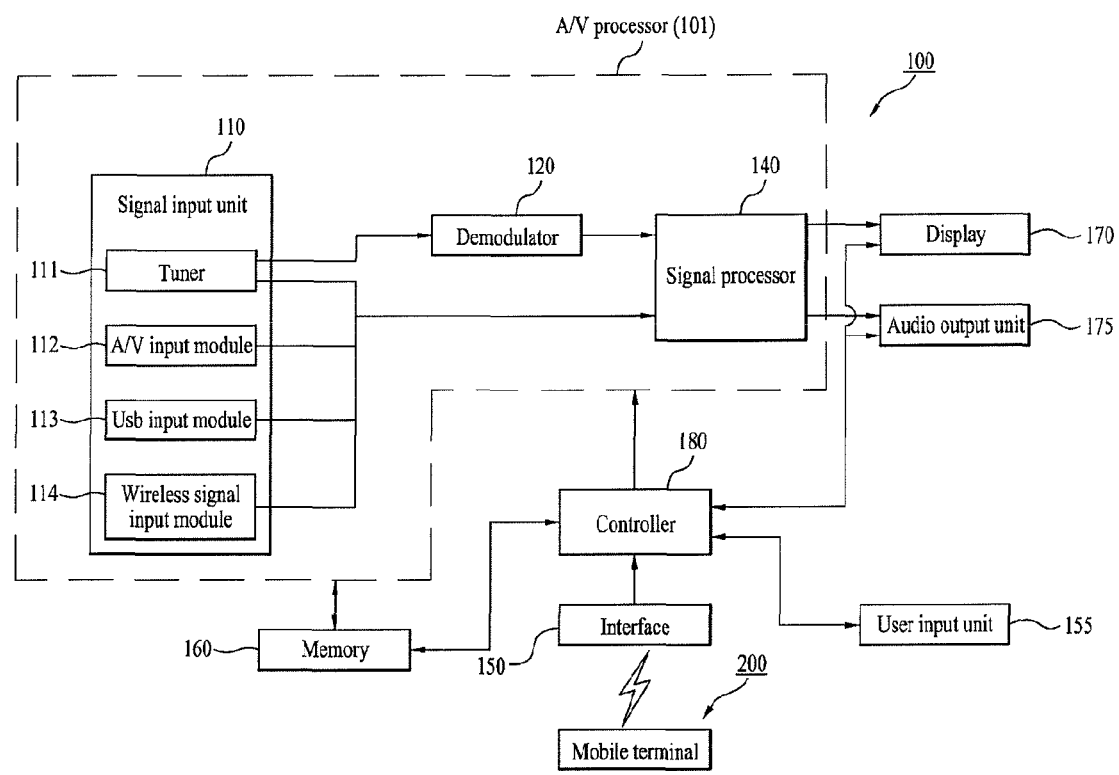
FIG. 3 is a block diagram of a display apparatus according to an embodiment of the present invention.

FIG. 3 is a block diagram of a display apparatus 100 according to an embodiment of the present invention.

Referring to FIG. 3, the display apparatus 100 according to the embodiment of the present invention includes an Audio/Video (A/V) processor 101, an interface 150, a memory 160, a display 170, an audio output unit 175, and a controller 180.

The A/V processor 101 processes an input audio or video signal so that an image or voice may be output to the display 170 or the audio output unit 175. For the video or audio processing, the A/V processor 101 may include a signal input unit 110, a demodulator 120, and a signal processor 140. The signal input unit 110 may include a tuner 111, an A/V input module 112, a Universal Serial Bus (USB) input module 113, and a wireless signal input module 114.

The tuner 111 selects a Radio Frequency (RF) broadcast signal corresponding to a channel selected by a user from among a plurality of RF broadcast signals received through an antenna and downconverts the selected RF broadcast signal into a digital Intermediate Frequency (IF) signal, DIF or an analog baseband A/V signal, CVBS/SIF. The analog baseband A/V signal CVBS/SIF may be directly input to the signal processor 140.

The demodulator 120 receives the digital IF signal DIF from the tuner 111 and demodulates the digital IF signal DIF, thus producing a streaming signal TS. The stream signal TS may be input to the signal processor 140.

The signal processor 140 demultiplexes a received signal into a number of signals, subjects the demultiplexed signals to a video and/or audio signal process, and outputs the processed signals as video data to the display 170 and/or as audio data to the audio output unit 175.

The signal input unit 110 may connect the display apparatus 100 to an external device. The signal input unit 110 is connected to an external device such as a Digital Versatile Disc (DVD) player, a Blu-ray player, a game console, a camera, a camcorder, or a computer (e.g., a laptop computer). Then, the signal input unit 110 externally receives a video, audio, and/or data signal from the external device and transmits the received external input signal to the signal processor 140. In addition, the signal input unit 110 may output video, audio, and data signals processed within the display apparatus 100 to the external device.

In order to receive or transmit audio and video signals from or to the external device, the A/V input module 112 of the signal input unit 110 may include a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, a D-sub port, an Institute of Electrical and Electronics Engineers (IEEE) 1394 port, a Sonly Phillips Digital Interface Format (SPDIF) port, and a Liquid High Definition (HD) port. An analog signal received through the CVBS port and the S-video port may be converted to a digital signal and then input to the signal processor 140. A digital signal received through any other input port may be input to the signal processor 140 without analog-to-digital conversion.

The USB input module 113 may receive video and audio signals through a USB port.

The wireless signal input module 114 may connect the display apparatus 100 to a wireless network. The display apparatus 100 may be connected wirelessly to the Internet through the wireless signal input module 114. In addition, the wireless signal input module 114 may conduct short-range wireless communication with other electronic devices.

The signal input unit 110 may connect the display apparatus 100 to a set-top box. If the set-top box is an Internet Protocol TV (IPTV) set-top box, the signal input unit 110 may provide a video, audio and/or data signal received from the IPTV set-top box to the signal processor 140 and may provide signals processed by the signal processor 140 to the IPTV set-top box, in order to enable interactive communication. The term 'IPTV' as used herein may cover an Internet TV and a full-browsing TV, which are capable of providing Internet access services.

The signal processor 140 may demultiplex an input stream signal TS. For example, the signal processor 140 may demultiplex a Moving Picture Experts Group-2 (MPEG-2) TS into a video signal, an audio signal, and a data signal. The signal processor 140 may decode the demultiplexed video signal. If the demultiplexed video signal is an encoded video signal, the signal processor 140 may decode the encoded video signal. More specifically, if the demultiplexed video signal is an MPEG-2 encoded video signal, the signal processor 140 may decode the video signal by an MPEG-2 decoder.

The video signal processed by the signal processor 140 is displayed on the display 170. The signal processor 140 may also process the demultiplexed audio signal.

The signal processor 140 may perform an On Screen Display (OSD) process. Specifically, the signal processor 140 may output information in the form of a graphical image or text to the screen of the display 170, based on at least one of the processed video and data signals and a signal received from a mobile terminal 200.

The memory 160 may store application programs used for the controller 180 to process and control signals, and may also store processed video, audio and data signals. The memory 160 may temporarily store a video, audio or data signal input to the signal input unit 110.

The memory 160 may include at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable Programmable ROM (EEPROM). The display apparatus 100 may open a file (such as a video file, a still image file, a music file, or a text file) stored in the memory 160 to the user and may execute an application stored in the memory 160 for the user.

The controller 180 provides overall control to the display apparatus 100.

The controller 180 may receive a signal from the mobile terminal 200 through the interface 150. The controller 180 identifies a command input to the mobile terminal 200 by the user from the received signal and controls the display apparatus 100 according to the command.

For example, if the user requests video information or audio information of the display apparatus 100 through the mobile terminal 200, the controller 180 may transmit a video signal or an audio signal processed by the signal processor 140 to the mobile terminal 200 through the interface 150.

If the user requests information about an application being executed in the display apparatus 100 through the mobile terminal 200, the controller 180 may transmit identification information or environment information about the application to the mobile terminal 200 through the interface 150.

Upon receipt of user-input data such as text from the mobile terminal 200 through the interface 150, the controller 180 may control the signal processor 140 to process the received data and output the processed video or audio data to the display 170.

Figure 4:
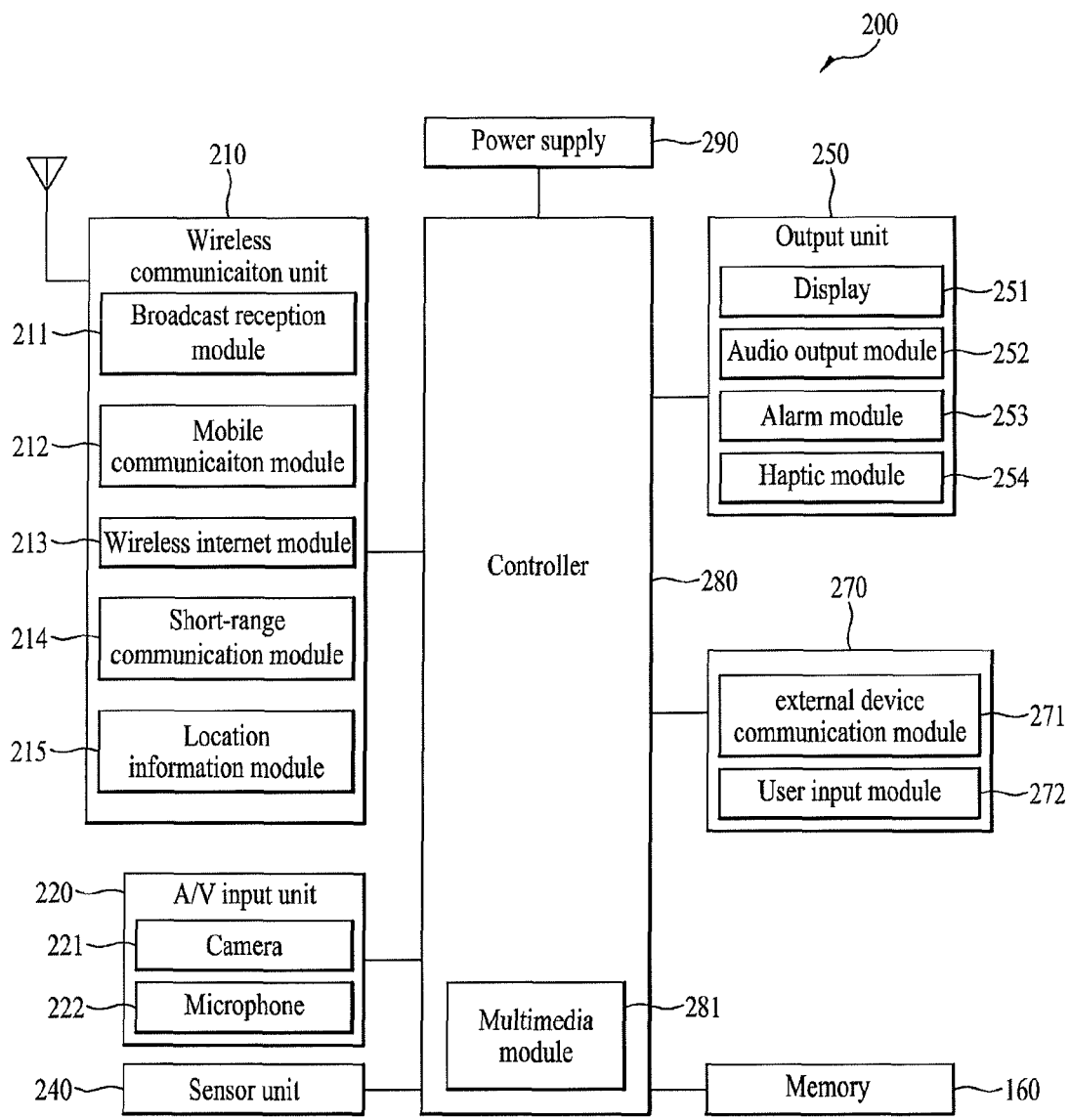
FIG. 4 is a block diagram of a mobile terminal according to an embodiment of the present invention.

FIG. 4 is a block diagram of the mobile terminal 200 according to an embodiment of the present invention.

The mobile terminal 200 of the present invention may include a wireless communication unit 210, an A/V input unit 220, a sensor unit 240, an output unit 250, a memory 260, an interface unit 270, a controller 280, and a power supply 290.

The mobile terminal 200 is shown in FIG. 4 as having a number of components in a given configuration. However, the mobile terminal 200 may include fewer components or more components than those shown in FIG. 4 in alternative embodiments. The components of the mobile terminal 200 will be described below.

The wireless communication unit 210 may include one or more modules for wireless communication between the mobile terminal 200 and a wireless communication system or between the mobile terminal 200 and a network where the mobile terminal 200 is located. For example, the wireless communication unit 210 may include a broadcast reception module 211, a mobile communication module 212, a wireless Internet module 213, a short-range communication module 214, and a location information module 215.

The broadcast reception module 211 receives a broadcast signal and/or broadcast-related information from an external broadcast management server on a broadcast channel. The broadcast channel may include a satellite channel and a terrestrial channel. The broadcast management server may be a server for generating and transmitting a broadcast signal and/or broadcast-related information to a terminal or receiving an already-generated broadcast signal and/or broadcast-related information and transmitting the received broadcast signal and/or broadcast-related information to a terminal. The broadcast signal may include a TV broadcast signal, a radio broadcast signal, and a data broadcast signal. Besides, the broadcast signal may be a combination of a TV or radio broadcast signal and a data broadcast signal.

The broadcast-related information may exist in various forms. For example, the broadcast-related information may be a Digital Multimedia Broadcasting (DMB) Electronic Program Guide (EPG) or a Digital Video Broadcast-Handheld (DVB-H) EPG. The broadcast signal and/or broadcast-related information received through the broadcast reception module 211 may be stored in the memory 260.

The mobile communication module 212 transmits a radio signal to and receives a radio signal from at least one of a Base Station (BS), an external terminal, and a server over a mobile communication network. The radio signal may include a voice signal, a video call signal, or various types of data such as text and a multimedia message.

The wireless Internet module 213 refers to a module used for wireless Internet connectivity. The wireless Internet module 213 may be built in the mobile terminal 200 or may be externally provided to the mobile terminal 200. For wireless Internet connection, the wireless Internet module 213 may use Wireless Local Area Network (WLAN) (i.e., Wi-Fi), Wireless Broadband (WiBro), World Interoperability for Microwave Access (WiMax), and High Speed Downlink Packet Access (HSDPA).

The short-range communication module 214 enables short-range communication. For the short-range wireless communication, the short-range communication module 214 may use Bluetooth, Radio-Frequency IDentification (RFID), Infrared Data Association (IrDA), Ultra WideBand (UWB), and ZigBee.

The location information module 215 is a module used to locate the mobile terminal 200. A Global Positioning System (GPS) module may be used as the location information module 215, for example.

Referring to FIG. 4, the A/V input unit 220 is used to input an audio signal or a video signal. The A/V input unit 220 may include a camera 221 and a microphone 222. The camera 221 processes picture frames of a still image or a video acquired from an image sensor in a video call mode or capturing mode. The processed picture frames may be displayed on a display 251.

The picture frames processed by the camera 221 may be stored in the memory 260 or may be transmitted to the outside through the wireless communication unit 210. The mobile terminal 200 may include two or more cameras 210 according to a use environment. The microphone 222 receives an external sound signal in a call mode, recording mode, or voice recognition mode and converts the received sound signal to electrical voice data. In the call mode, the mobile communication module 212 may convert the voice data to a form transmittable to a mobile communication BS and transmit it. Various noise cancellation algorithms may be implemented for the microphone 222 to cancel noise generated during reception of an external sound signal.

The sensor unit 240 senses a current state of the mobile terminal 200 in relation to the open or closed state, position, user contact or non-contact, direction, and acceleration/deacceleration of the mobile terminal 200 and generates a sensed signal to control the operation of the mobile terminal 200 based on the sensed state. The sensor unit 240 may include a proximity sensor, a gravity sensor, etc.

The output unit 150 is used to generate visual, audible, or haptic outputs. Thus, the output unit 150 may include the display 251, an audio output module 252, an alarm module 253, and a haptic module 254.

The display 251 displays (i.e. outputs) information processed in the mobile terminal 200. For example, if the mobile terminal 200 is in the call mode, a UI or Graphic User Interface (GUI) related to a call is displayed on the display 251. If the mobile terminal 200 is in the video call mode or capturing mode, a captured and/or received image, a UI, or a GUI is displayed on the display 251. In addition, screen information received from the external display apparatus 100 may be displayed on the display 251.

The display 251 may include at least one of a Liquid Crystal Display (LCD), a Thin Film Transistor-LCD (TFT-LCD), an Organic Light-Emitting Diode (OLED) display, a flexible display, and a three-dimensional (3D) display.

If the display 251 and a sensor for sensing touches (hereinafter, referred to as a touch sensor) are layered, that is, the display 251 is configured into a touch screen, the display 251 can be used not only as an output device but also as an input device. The touch sensor may take the form of, for example, a touch film, a touch sheet, a touch pad, etc.

The touch sensor may convert a variation in pressure applied at or in capacitance generated from a specific position of the display 251 to an electrical input signal. The touch sensor may detect a touched pressure as well as a touched position and area. Upon sensing a touch input, the touch sensor outputs a touch signal or touch signals corresponding to the touch input to a touch controller. The touch controller processes the touch signal or signals and provides the processed signal or signals to the controller 280. Thus, the controller 280 identifies a touched area of the display 251, analyzes a user command according to the touch signal or touch signals, and controls the mobile terminal 200 according to the user command.

The audio output module 252 may output audio data received from the wireless communication unit 210 or stored in the memory 260 in a call signaling mode, call mode, recording mode, voice recognition mode, or broadcast reception mode. The audio output module 252 also outputs a sound signal (e.g. an incoming call ringtone, an incoming message ringtone, etc.) related to a function performed by the mobile terminal 200. The audio output module 252 may include a receiver, a speaker, a buzzer, etc.

The alarm module 253 outputs a signal indicating occurrence of an event in the mobile terminal 200. Events such as incoming call signaling, message reception, key input, touch input, etc. may occur to the mobile terminal 200. The alarm module 253 may notify occurrence of an event by a signal other than a video or audio signal, for example, vibration. Considering that the video or audio signal can be output through the display 251 or the audio output module 252, the display 251 or the audio output module 252 may be regarded as a part of the alarm module 253.

The haptic module 254 creates various haptic effects to the user. A major example of the haptic effects is vibration. The strength and pattern of vibrations generated from the haptic module 254 can be controlled. For instance, different kinds of vibrations may be combined or sequentially output.

The memory 260 may store programs needed for operations of the controller 280 and may temporarily store input data and output data (e.g. a phonebook, a message, a still image, a video, etc.). The memory 260 may store data regarding vibrations of various patterns and sounds that are output when the touch screen is touched.

The interface unit 270 includes an external device communication module 271 and a user input module 272, functioning as a path between the mobile terminal 200 and every external device connected to the mobile terminal 200 or between the mobile terminal 200 and a user.

The external device communication module 271 receives data from every external device connected to the mobile terminal 200 or transmits data within the mobile terminal 200 to the external device.

The user input module 272 may generate input data for the user to control operations of the mobile terminal 200. The user input module 272 may include a keypad, a dome switch, a touch pad (resistive/capacitive), a jog wheel, a jog switch, etc.

The controller 280 generally provides overall control to the mobile terminal 200. For instance, the controller 280 performs control operations and processes in relation to a voice call, data communication, a video call, communication with the external display apparatus 100, etc.

The power supply 290 receives external power or internal power and supplies power to each component, for the operation of each component, under the control of the controller 280.

The embodiments of the present invention may be implemented in a recording medium readable by a computer or a computer-like device by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and other electrical units for performing functions. In some cases, the embodiments of the present invention may be implemented in the controller 280. In a software configuration, procedures and functions according to the embodiments of the present invention may be implemented in the form of software modules that perform one or more functions and operations described herein. Software code may be realized by a software application written in an appropriate programming language, stored in the memory 260, and executed by the controller 280.

Now a description will be given of various methods for providing a UI using the display apparatus 100 and the mobile terminal 200 according to an embodiment of the present invention.

Figure 5:
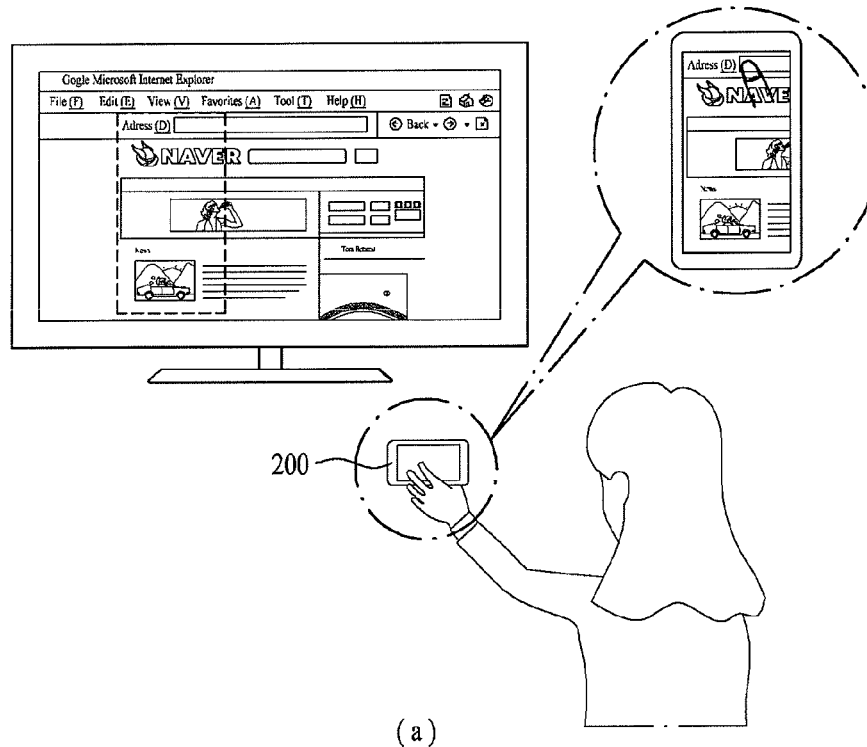
FIG. 5 is a view referred to for describing UIs provided through the mobile terminal according to an embodiment of the present invention.
Figure 5:
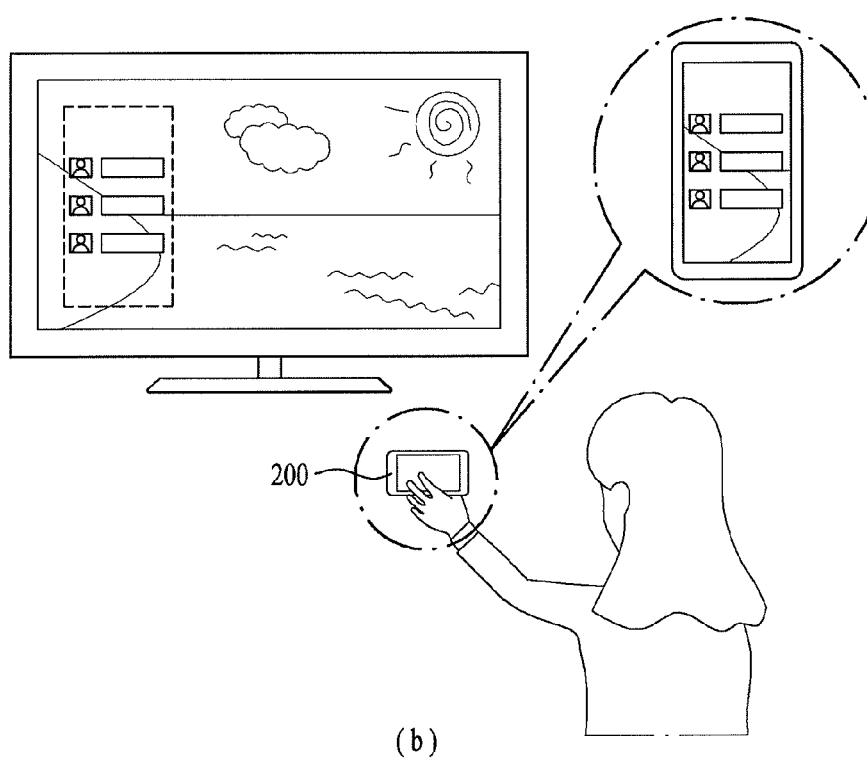

FIG. 5 is a view referred to for describing UIs provided through the mobile terminal 200 according to an embodiment of the present invention.

Referring to FIG. 5, to input data such as text to the display apparatus 100 using the mobile terminal 200, the user may select an input window of the display apparatus 100 and then enter text in the mobile terminal 200 so that the text can be input in the input window.

When the user inputs data such as text to the display apparatus 100 through the mobile terminal 200, the user may need to input the data while viewing the screen of the display apparatus 100.

For example, as illustrated in FIG. 5(a), the user may input a Web site address written on a Web page into a Web address window of the display apparatus 100. In this instance, when the user enters the Web site address through the mobile terminal 200, the user should inconveniently view from the screen of the display apparatus 100 to the screen of the mobile terminal 200 and vice versa.

In another example as illustrated in FIG. 5(b), when the user wants to input text in a messenger window of the display apparatus 100 through the mobile terminal 200, the user should input the text after reading another person's message displayed on the screen of the display apparatus 100 and inconveniently view from the screen of the display apparatus 100 to the screen of the mobile terminal 200 and vice versa, in order to make sure that the user has input the right text.

Accordingly, the present invention is intended to provide a UI that allows a user to efficiently input data such as text to the display apparatus 100 without the inconvenience of alternately viewing the screens of the display apparatus 100 and the mobile terminal 200.

First of all, the user selects the input window of the display apparatus 100 using the mobile terminal 200. FIG. 5(a) illustrates a case where the user selects a Web address window, and FIG. 5(b) illustrates a case where the user selects a messenger window. Then a screen displayed on the display 100 is output to the mobile terminal 200 so that a UI is provided to enable the user to readily input data such as text without viewing the screen of the display apparatus 100.

Upon user selection of the input window of the display apparatus 100, the display apparatus 100 transmits information about its current screen to the mobile terminal 200 through the interface 150 of the display apparatus 100.

The mobile terminal 200 displays the screen information received from the display apparatus 100 on the display 251 after processing the screen information.

In addition, the mobile terminal 200 may process the screen information so as to divide the screen of the display apparatus 100 into a plurality of screens and thus enable the user to efficiently input text.

Specifically, the mobile terminal 200 may divide the screen of the display apparatus 100 into a first screen being an input screen of the display apparatus 100 and a second screen being a screen of the display apparatus 100 near to the input screen. Referring to FIG. 5(a), the first screen may be a Web address input screen and the second screen may be a Web page screen near to the Web address input screen. The second screen may be configured to include various parts of the screen of the display apparatus 100 according to implementations.

Figure 6:
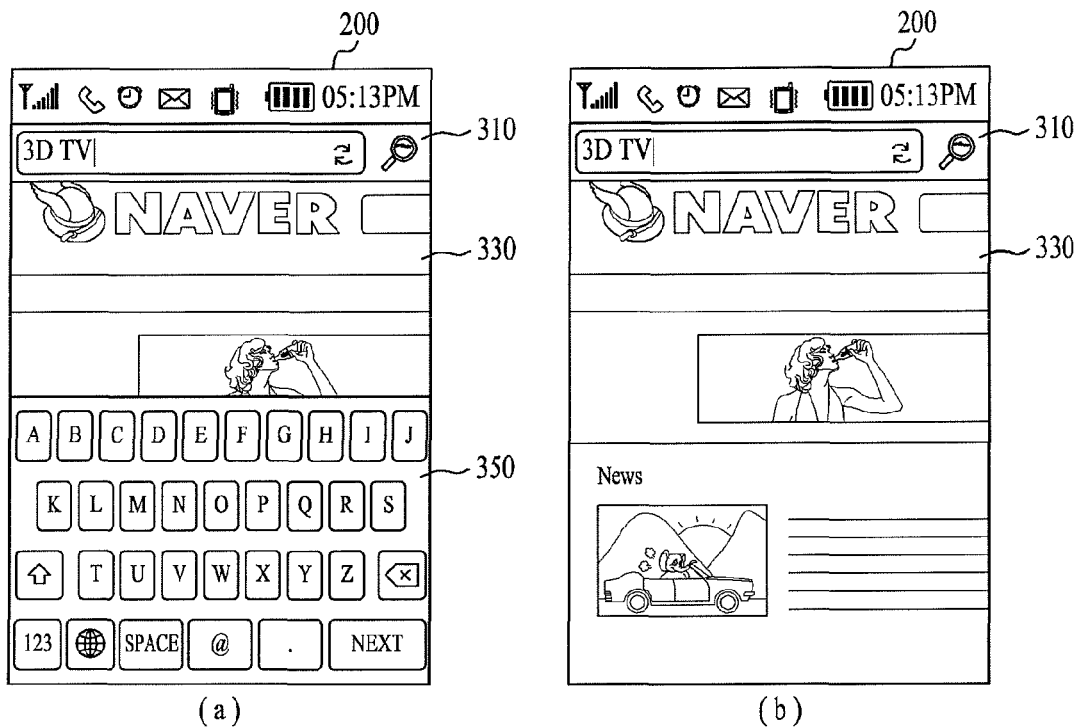
FIG. 6 illustrates screens displayed on the mobile terminal in UIs according to embodiments of the present invention.
Figure 6:
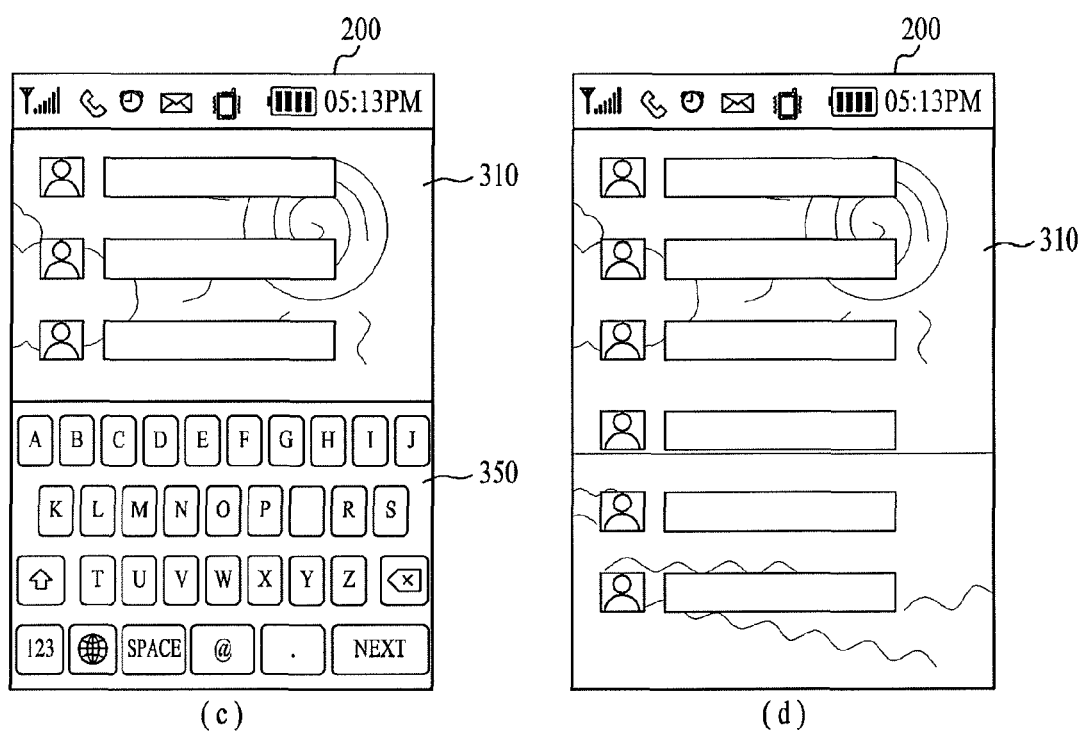

FIG. 6 illustrates screens of the mobile terminal 200 in UIs according to an embodiment of the present invention.

The screen of the display 251 in the mobile terminal 200 configured to output screen information about the display apparatus 100 includes an input window 310, a display window 330, and a keyboard window 350.

The afore-described first screen is displayed in the input window 310. That is, the input screen of the display apparatus 100 is displayed in the input window. The input screen is the Web address input screen in FIG. 5(a) and the messenger screen in FIG. 5(b).

The afore-described second screen is displayed in the display window 330. That is, a screen of the display apparatus 100 around the input screen of the display apparatus 100 is output in the display window 330. The second screen corresponds to a Web page screen under the Web address input screen in FIG. 5(a) and corresponds to the whole or a part of the remaining screen of the display apparatus 100 except for the messenger screen in FIG. 5(b).

A keyboard is displayed in the keyboard window 350, for enabling the user to input data such as text. An input screen corresponding to an input device supported by the mobile terminal, for example, a keypad screen or gesture input screen may be displayed in the keyboard window 350 in the present invention.

FIG. 6(a) illustrates a case where the screen of the display 251 is configured to include all of the input window 310, the display window 330, and the keyboard window 350 in the mobile terminal 200.

FIG. 6(b) illustrates a case where the screen of the display 251 is configured to include only the input window 310 and the display window 330 in the mobile terminal 200. In this instance, the user can view a larger screen in the display window 330

FIG. 6(c) illustrates a case where the screen of the display 251 is configured to include only the input window 310 and the keyboard window 350 in the mobile terminal 200. When the display window 330 is not needed, as is the case with the messenger screen, the user can view a larger input screen.

FIG. 6(d) illustrates a case where the screen of the display 251 is configured to include only the input window 310 in the mobile terminal 200. When the user needs only to read other users' conversation without entering a message, as is the case with the messenger screen, the display 251 may display only the input window 310.

The screen modes illustrated in FIGS. 6(a) to 6(d) may be selectively used according to user selection. The user may designate an intended display position for an intended window.

In addition, the mobile terminal 200 may configure each of the input window 310, the display window 330, and the keyboard window 350 as a Picture-In-Picture (PIP) screen on the display 251.

Therefore, the user can input data such as text into the input screen of the display apparatus 100, while viewing the screen of the display 100 displayed in the display window 330. This eliminates the inconvenience with which the user inputs data to the mobile terminal 200, alternately viewing the screens of the display apparatus 100 and the mobile terminal 200.

Figure 7:
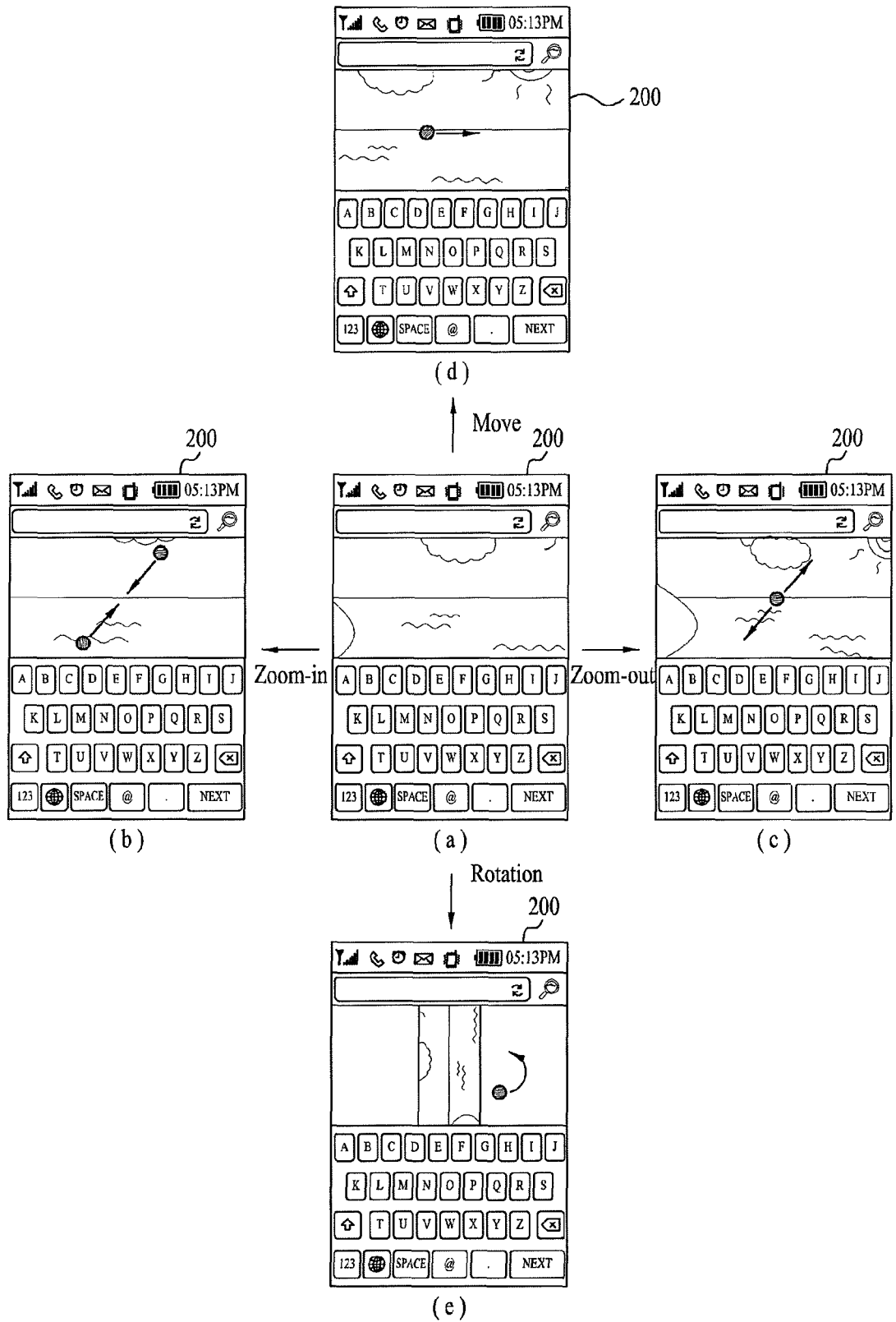
FIG. 7 illustrates a method for controlling a display window in a UI according to an embodiment of the present invention.

FIG. 7 illustrates a method for controlling the display window 330 in a UI according to an embodiment of the present invention.

The user may control the display window 330 of the mobile terminal 200. That is, the user may select or control the screen of the display apparatus 100 displayed in the display window 330.

To be more specific, when the user enters a control command for controlling the display window 330, the user input module 272 generates a control signal corresponding to the control command of the user in the present invention. The controller 280 zooms in, zooms out, moves, or rotates the screen of the display apparatus 100 displayed in the display window 330 according to the control signal.

FIG. 7(*a*) illustrates a current screen of the mobile terminal 200.

When the user inputs a zoom-in command for the display window 330 in FIG. 7(*a*), the second screen is zoomed-in in the display window 330 as illustrated in FIG. 7(*b*).

When the user inputs a zoom-out command for the display window 330 in FIG. 7(*a*), the second screen is zoomed-out in the display window 330 as illustrated in FIG. 7(*c*).

When the user inputs a screen shift command for the display window 330 in FIG. 7(*a*), the second screen is moved in a user-desired direction in the display window 330 as illustrated in FIG. 7(*d*).

When the user inputs a rotation command for the display window 330 in FIG. 7(*a*), the second screen is rotated at a user-desired angle in a user-desired direction in the display window 330 as illustrated in FIG. 7(*e*).

If screen information about the display apparatus 100 is additionally needed along with the user control of the display window 330, the controller 280 may request the screen information to the display apparatus 100 by controlling the external device communication module 271.

Because the screen of the display apparatus 100 is subject to real-time switching, the controller 280 may request screen information to the display apparatus 100 in real time.

Upon receipt of the requested screen information from the display apparatus 100, the controller 280 updates the screen of the display 251 by controlling the output unit 250.

Figure 8:
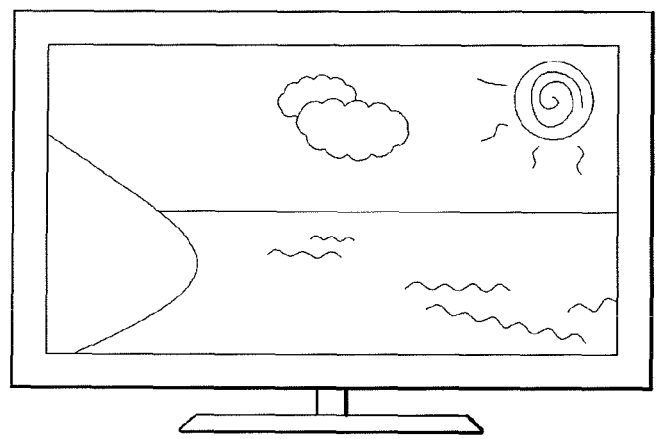
FIG. 8 illustrates a method for controlling a display window in a UI according to another embodiment of the present invention.
Figure 8:
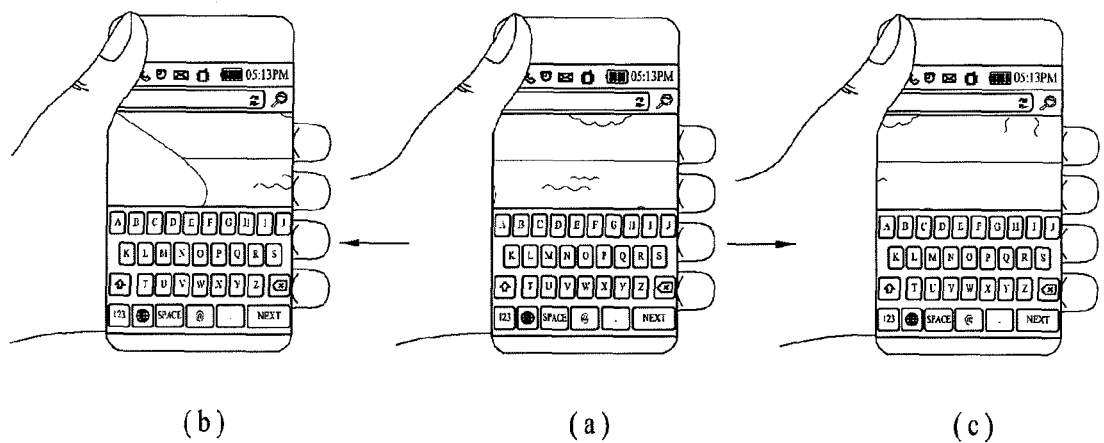

FIG. 8 illustrates a method for controlling the display window 330 in a UI according to another embodiment of the present invention.

The user may control the display window 330 using the sensor unit 240 of the mobile terminal 200.

As described before, the sensor unit 240 senses a current state of the mobile terminal 200 in relation to the location, posture, acceleration, or deacceleration of the mobile terminal 200 and generates a sensed signal for controlling an operation of the mobile terminal 200. For example, the sensor unit 240 may include a proximity sensor, a gravity sensor, etc.

When the user moves, carrying the mobile terminal 200, the sensor unit 240 senses the moved distance and direction of the mobile terminal 200 and generates a sensed signal corresponding to the sensed distance and direction of the mobile terminal 200.

The controller 280 controls the display window 330 according to the sensed signal received from the sensor unit 240.

FIG. 8(*b*) illustrates a case where the user has moved to the left from the position illustrated in FIG. 8(*a*). In this instance, the sensor unit 240 of the present invention generates a sensed signal corresponding to the moved distance and direction of the user and transmits the sensed signal to the controller 280. The controller 280 displays the second screen moved to the left in the display window 330 according to the received sensed signal. The sensor unit 240 can measure the moved distance of the mobile terminal 200 and thus the controller 280 moves the second screen to the left as much as the moved distance.

Likewise, FIG. 8(*c*) illustrates a case where the user has moved to the right from the position illustrated in FIG. 8(*a*). In this instance, the sensor unit 240 of the present invention generates a sensed signal corresponding to the moved distance and direction of the user and transmits the sensed signal to the controller 280. The controller 280 displays the second screen moved to the right in the display window 330 according to the received sensed signal. The sensor unit 240 can measure the moved distance of the mobile terminal 200 and thus the controller 280 moves the second screen to the right as much as the moved distance.

In addition, when the user rotates the mobile terminal 200, the controller 280 may display a rotated version of the second screen in the display window 330.

When the user moves the mobile terminal 200 back and forth, the controller 280 may display a zoomed-in or zoomed-out version of the second screen in the display window 330.

Figure 9:
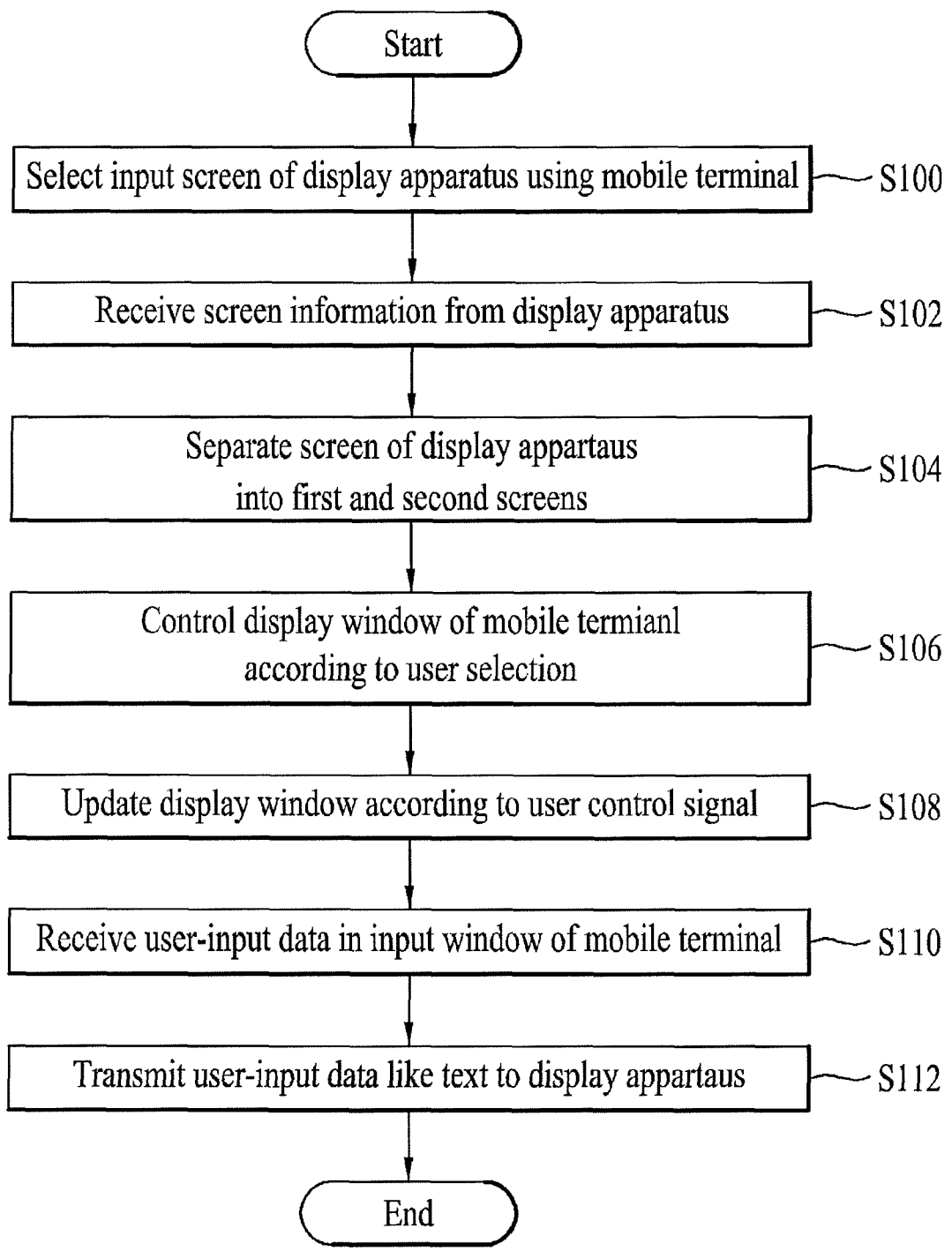
FIG. 9 is a flowchart illustrating a method for providing a UI according to an embodiment of the present invention.

FIG. 9 is a flowchart illustrating a method for providing a UI according to an embodiment of the present invention.

Referring to FIG. 9, the user selects an input window in a screen displayed on the display apparatus 100 through the mobile terminal 200 (S100).

The controller 180 of the display apparatus 100 transmits information about a current video signal processed by the signal processor 140 and output to the display 170, that is, screen information about the display apparatus 100 to the mobile terminal 200 through the interface 150.

Thus, the controller 280 of the mobile terminal 200 receives the screen information from the display apparatus 100 by controlling the external device communication module 271 of the interface unit 270 (S102).

The controller 280 of the mobile terminal 200 divides the screen of the display apparatus 100 into a first screen and a second screen by processing the screen information about the display apparatus 100. As stated before, the first screen may be an input screen of the display apparatus 100 and the second screen may be a screen of the display apparatus 100 around the input screen. The controller 280 of the mobile terminal 200 displays the first and second screens on the display 251 (S104).

As described before, the first screen may be displayed in the input window 310 and the second screen may be displayed in the display window 330. In the present invention, the mobile terminal 200 may further display the keyboard window 350 on the display 251 in order to allow the user to enter data such as text.

The user may control the display window 330 of the mobile terminal 200. That is, the user may select or control a screen of the display apparatus 100 to be displayed in the display window 330 (S106).

The display window 330 may be zoomed-in, zoomed-out, moved, or rotated based on a control signal of the user input module 272 or a sensed signal from the sensor unit 240, as described before with reference to FIGS. 7 and 8.

The controller 280 of the mobile terminal 200 updates the screen displayed in the display window 330 according to the control signal or the sensed signal generated according to the user's control operation (S108). When screen information about the display apparatus 100 is additionally needed, the controller 280 may request the screen information to the display apparatus 100 by controlling the external device communication module 271.

Upon input of data such as text in the input window 310 by the user (S112), the controller 280 controls the external device communication module 271 to transmit the received data to the display apparatus 100.

Figure 10:
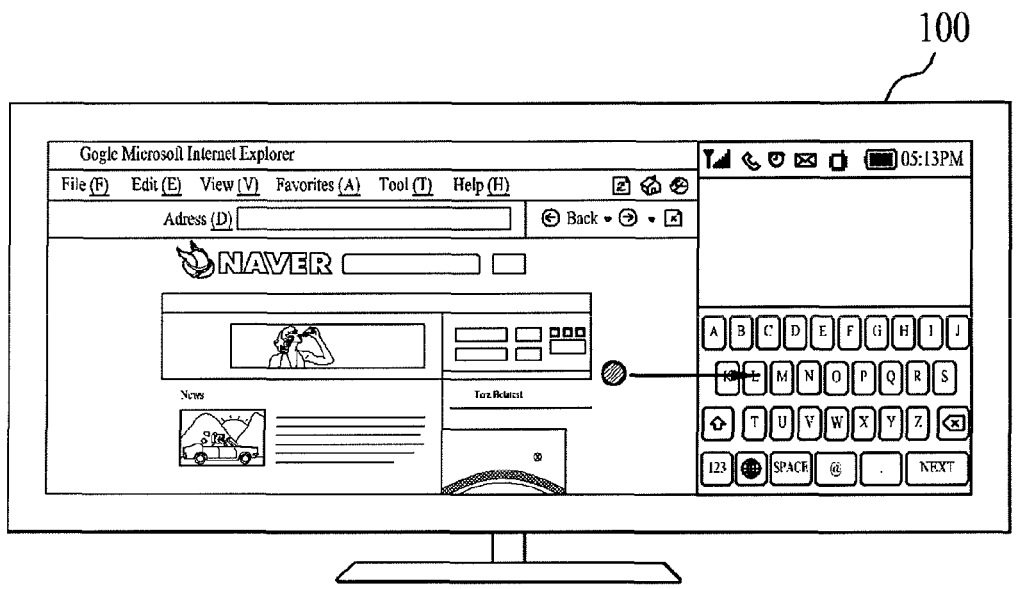
FIG. 10 illustrates a method for outputting a screen of a display apparatus to the mobile terminal according to an embodiment of the present invention.
Figure 10:
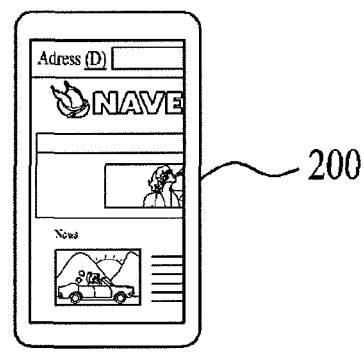

FIG. 10 illustrates a method for outputting a screen of the display apparatus 100 on the mobile terminal 200 according to an embodiment of the present invention.

As described before, a screen displayed on the display apparatus 100 may be output to the mobile terminal 200 by transmitting screen information, that is, information about a video signal output to the display 170 to the mobile terminal 200 through the interface 150 by the controller 180 of the display apparatus 100 and outputting the screen information to the display 251 through the external device communication module 271 by the controller 280 of the mobile terminal 200.

In addition to outputting a video screen, the display apparatus 100 may execute an application.

In this instance, while the mobile terminal 200 may receive only screen information from the display apparatus 100 and then output the received screen information, the mobile terminal 200 may receive information about the executed application from the display apparatus 100 and execute the same application.

For instance, when an application such as Internet Explorer is being executed in the display apparatus 100 and the user wants to view a screen displayed on the display apparatus 100 through the mobile terminal 200, the mobile terminal 200 executes the same application, i.e. Internet Explorer and accesses the same Web page displayed on the display apparatus 100, rather than the mobile terminal 200 simply displays the screen of the display apparatus 100.

Referring to FIG. 10(a) illustrating a screen of the display apparatus 100, the screen of the display apparatus 100 is shown in the left part, whereas a screen of the mobile terminal 200 is shown in the right part, for the convenience' sake of description.

When the user selects the screen of the display apparatus 100, drags the screen of the display apparatus 100 to the screen of the mobile terminal 200, and drops it on the screen of the mobile terminal 200, the controller 180 of the display apparatus 100 determines that the drag and drop is a user command to output the screen of the display apparatus 100 on the mobile terminal 100.

If a specific application is being executed in the display apparatus 100, the controller 180 of the display apparatus 100 transmits information about the application to the mobile terminal 200 so that the same application may be executed in the mobile terminal 200.

As illustrated in FIG. 10(b), the application Internet Explorer being executed in the display apparatus 100 is also executed in the mobile terminal 200, for the user.

Because the environment of each application may differ in the display apparatus 100 and the mobile terminal 200, the mobile terminal 200 may receive environment information about the application from the display apparatus 100 and thus may execute the application in an optimized manner.

For instance, even though the same application Internet Explorer is executed in the display apparatus 100 and the mobile terminal 200, the mobile terminal 200 may access an appropriate Web site, not the same Web site.

Figure 11:
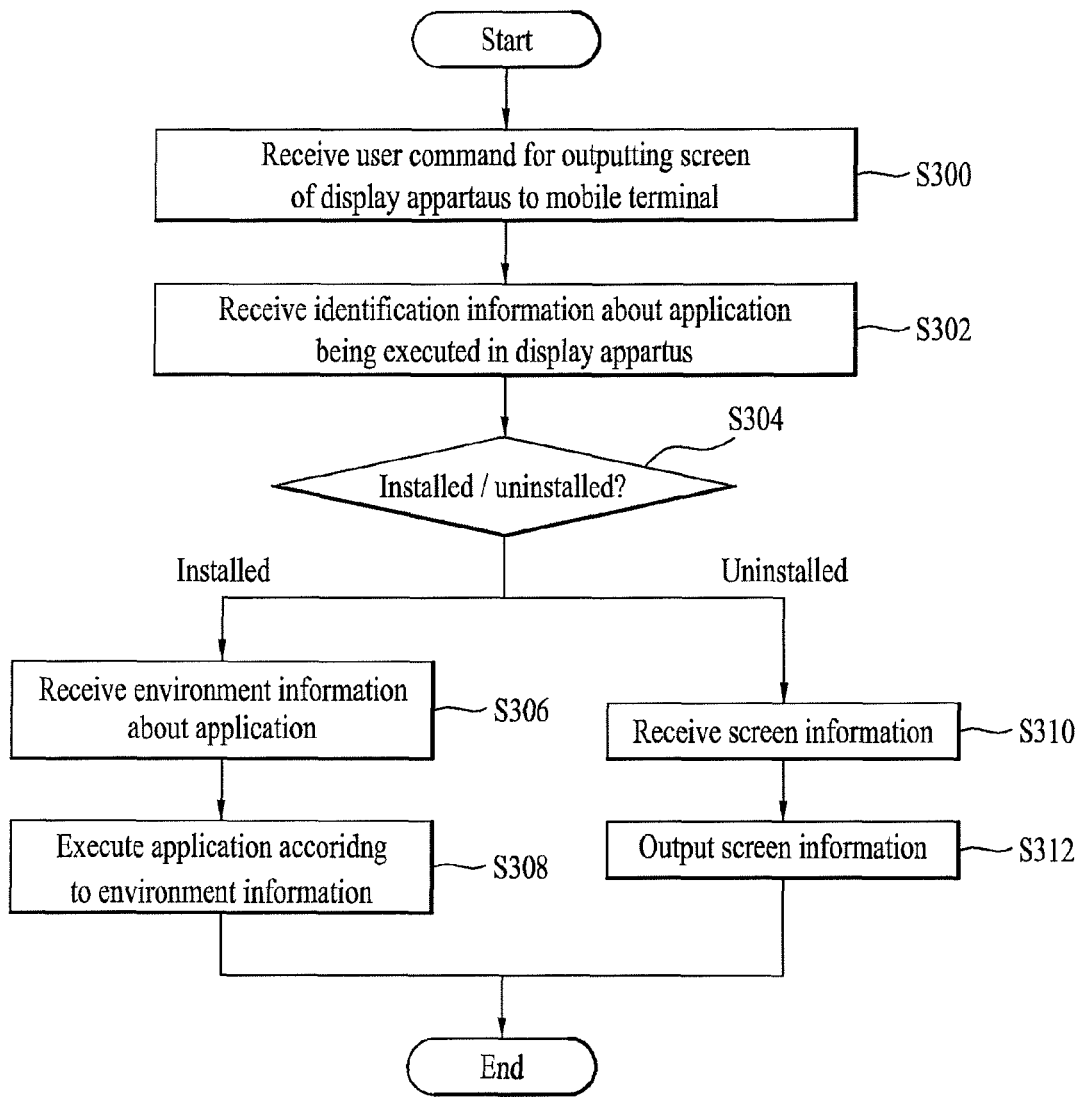
FIG. 11 is a flowchart illustrating a method for outputting a screen of a display apparatus to the mobile terminal according to another embodiment of the present invention.

FIG. 11 is a flowchart illustrating a method for outputting a screen of the display apparatus 100 on the mobile terminal 200 according to another embodiment of the present invention.

Referring to FIG. 11, the user enters a command for outputting a screen displayed on the display apparatus 100 to the mobile terminal 200. For example, the user may select the screen of the display apparatus 100, drag the screen of the display apparatus 100 to a screen of the mobile terminal 200, and drop it on the screen of the mobile terminal 200 (S300).

The controller 180 of the display apparatus 100 controls the interface 150 to transmit identification information about an application being executed in the display apparatus 100 to the mobile terminal 200. The identification information about the application identifies the application being executed in the display apparatus 100. The controller 280 of the mobile terminal 200 controls the external device communication module 271 to receive the identification information about the application (S302).

The controller 280 of the mobile terminal 200 determines whether the application has been installed in the mobile terminal 200 using the received identification information (S304).

If the same application has been installed in the mobile terminal 200, the controller 280 of the mobile terminal 200 controls the external device communication module 271 to request environment information about the application to the display apparatus 100 and receive the environment information from the display apparatus 100 (S306).

Environment information about an application may refer to every information needed to execute the application in the same environment. For example, the environment information may include a Web site address to be accessed on Internet Explorer.

The controller 280 of the mobile terminal 200 executes the installed application under the same condition of the application being executed in the display apparatus 100, according to the received environment information (S308).

On the other hand, if the same application has not been installed in the mobile terminal 200, the controller 280 of the mobile terminal 200 simply receives only screen information about the display apparatus 100 (S310) and outputs the received screen information on the display 251 (S312).

As is apparent from the above description, according to the mobile terminal and the method for providing a UI using the mobile terminal according to an embodiment of the present invention, a screen displayed on a display apparatus is output on the mobile terminal in a user-friendly manner and a user can efficiently input data such as text to the display apparatus through the mobile terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display;
   an interface unit configured to transmit and receive data to and from an external display apparatus, said external display apparatus including a processor configured to display information including an input region and a non-input region on the external display apparatus, wherein the input region includes a first text input box; and a controller configured to:
receive data via the interface unit and interacting with the external display apparatus corresponding to the information displayed on the external display apparatus;
display on the display of the mobile terminal a first display screen including a second text input box corresponding to the first text input box of the input-region displayed on the external display apparatus and a second display screen including at least a portion of the non-input-region displayed on the external display apparatus, wherein the second text input box is displayed at a first position on the display;
display on the display of the mobile terminal a keypad for inputting information into the second text input box while no keypad is displayed on the external display apparatus, wherein the keypad is displayed at a second position on the display;
maintain the second text input box and the keypad displayed at the first position and the second position on the display of the mobile terminal, respectively, when the at least the portion of the non-input region is moved in the second display screen;
receive identification information about an internet browser application being executed in the external display apparatus from the external display apparatus;
determine whether a corresponding internet browser application is present in the mobile terminal based on the identification information;
execute the corresponding internet browser application on the mobile terminal according to the received identification information when the internet browser application is present in the mobile terminal; and
access the same web site displayed on the external display apparatus,
wherein when the corresponding internet browser application is not present on the mobile terminal, the controller is further configured to:
receive environment information about the internet browser application from the external display apparatus;
optimize the received environment information based on the mobile terminal;
execute an internet browser application on the mobile terminal according to the optimized environment information; and
access an appropriate web site based on the optimized environmental information.

2. The mobile terminal of claim 1, wherein the controller is further configured to control the display to display a keypad window including the keypad at least partially overlaying the second display screen, and to control the interface unit to transmit the information input into the input region displayed in the first display screen to the input region displayed on the external display apparatus.

3. The mobile terminal of claim 1, wherein the controller is further configured to receive an input command instructing said at least the portion of the non-input region displayed in the second display screen be moved, and to control the display to move the non-input region within the second display screen based on the input command such that more or less of the partial portion of the non-input region is displayed in the second display screen.

4. The mobile terminal of claim 3, wherein the input command includes at least one of 1) a zoom-in instruction for zooming in on the non-input region displayed in the second display screen, 2) a zoom-out instruction for zooming out on the non-input region displayed in the second display screen, 3) a rotating instruction for rotating the non-input region displayed in the second display region, and 4) a moving instruction for moving the non-input region displayed in the second display region.

5. The mobile terminal of claim 3, further comprising:
a sensing unit configured to sense a physical movement of the mobile terminal and to convert the sensed physical movement of the mobile terminal into the input command instructing said at least the portion of the non-input region displayed in the second display screen be moved.

6. The mobile terminal of claim 1, wherein when the information displayed on the external display apparatus is updated, the controller is further configured to control the display to correspondingly update the portion of the non-input region displayed in the second display screen.

7. The mobile terminal of claim 1, wherein when the external display apparatus displays the information including the input region and the non-input region in a first region of the external display apparatus and displays information currently displayed on the mobile terminal in a second display region of the external apparatus, and a signal is received dragging from the first region into the second region, the controller is further configured to control the display of the mobile terminal to display the information including the input region and the non-input region currently displayed on the external display apparatus as a full screen on the display of the mobile terminal.

8. The mobile terminal of claim 1, wherein when the controller determines the application is not present in the mobile terminal, the controller is further configured to control the interface unit to only receive the data from the external display apparatus corresponding to the information displayed on the external display apparatus and to control the display of the mobile terminal to display the received data in the first and second display screens.

9. A method of controlling a mobile terminal, the method comprising:
transmitting and receiving data, via an interface unit of the mobile terminal, to and from an external display apparatus, said external display apparatus including a processor configured to display information including an input region and a non-input region on the external display apparatus, wherein the input region includes a first text input box;
controlling, via a controller of the mobile terminal interacting with the external display apparatus, the interface unit to receive data from the external display apparatus corresponding to the information displayed on the external display apparatus;
displaying, via a display of the mobile terminal, a first display screen including a second text input box corresponding to the first text input box of the input-region displayed on the external display apparatus and a second display screen including at least a portion of the non-input-region displayed on the external display apparatus, wherein the second text input box is displayed at a first position on the display;
displaying on the display of the mobile terminal a keypad for inputting information into the second text input box while no keypad is displayed on the external display apparatus, wherein the keypad is displayed at a second position on the display;
maintaining the second text input box and the keypad displayed at the first position and the second position on the display of the mobile terminal, respectively, when the at least the portion of the non-input region is moved in the second display screen;

receiving identification information about an internet browser application being executed in the external display apparatus from the external display apparatus;

determining whether a corresponding internet browser application is present in the mobile terminal based on the identification information;

executing the corresponding internet browser application on the mobile terminal according to the received identification information when the internet browser application is present in the mobile terminal; and accessing the same web site displayed on the external display apparatus, wherein when the corresponding internet browser application is not present on the mobile terminal, the method further comprises:

receiving environment information about the internet browser application from the external display apparatus;

optimizing the received environment information based on the mobile terminal;

executing an internet browser application on the mobile terminal according to the optimized environment information; and accessing an appropriate web site based on the optimized environmental information.

10. The method of claim 9, further comprising:

displaying, on the display of the mobile terminal, a keypad window including the keypad at least partially overlaying the second display screen for inputting information into the input region displayed in the first display screen; and transmitting, via the interface unit, the information input into the input region displayed in the first display screen to the input region displayed on the external display apparatus.

11. The method of claim 9, further comprising:

receiving, via the controller, an input command instructing said at least the portion of the non-input region displayed in the second display screen be moved; and controlling, via the controller, the display to move the non-input region within the second display screen based on the input command such that more or less of the partial portion of the non-input region is displayed in the second display screen.

12. The method of claim 11, wherein the input command includes at least one of 1) a zoom-in instruction for zooming in on the non-input region displayed in the second display screen, 2) a zoom-out instruction for zooming out on the non-input region displayed in the second display screen, 3) a rotating instruction for rotating the non-input region displayed in the second display region, and 4) a moving instruction for moving the non-input region displayed in the second display region.

13. The method of claim 11, further comprising:

sensing, via a sensing unit of the mobile terminal, a physical movement of the mobile terminal and converting the sensed physical movement of the mobile terminal into the input command instructing said at least the portion of the non-input region displayed in the second display screen be moved.

14. The method of claim 9, wherein when the information displayed on the external display apparatus is updated, the method further comprises controlling the display to correspondingly update the portion of the non-input region displayed in the second display screen.

15. The method of claim 9, wherein when the external display apparatus displays the information including the input region and the non-input region in a first region of the external display apparatus and displays information currently displayed on the mobile terminal in a second display region of the external apparatus, and a signal is received dragging from the first region into the second region, the method further comprises controlling the display of the mobile terminal to display the information including the input region and the non-input region currently displayed on the external display apparatus as a full screen on the display of the mobile terminal.

16. The method of claim 9, wherein when the application is not present in the mobile terminal, the method further comprises:

controlling the interface unit to only receive the data from the external display apparatus corresponding to the information displayed on the external display apparatus; and controlling the display of the mobile terminal to display the received data in the first and second display screens.

* * * * *